(12) United States Patent
Shigekawa

(10) Patent No.: US 7,626,140 B2
(45) Date of Patent: Dec. 1, 2009

(54) SOLDERING IRON HAVING A QUICKLY DETACHABLE TIP UTILIZING A RETRACTABLE INSULATED GRIPPING MECHANISM

(75) Inventor: Tomohiro Shigekawa, Hiroshima-ken (JP)

(73) Assignee: Taiyo Electric Ind. Co., Ltd., Fukuyama-shi (JP)

( * ) Notice: Subject to any disclaimer, the term of this patent is extended or adjusted under 35 U.S.C. 154(b) by 0 days.

(21) Appl. No.: 11/318,194

(22) Filed: Dec. 22, 2005

(65) Prior Publication Data

US 2006/0157467 A1 Jul. 20, 2006

(30) Foreign Application Priority Data

Jan. 18, 2005 (JP) ............... 2005-010092

(51) Int. Cl.
*H05B 3/42* (2006.01)
*H05B 1/00* (2006.01)
*B23K 3/03* (2006.01)

(52) U.S. Cl. ............... 219/229; 219/231; 219/233; 219/238; 219/240; 228/55

(58) Field of Classification Search ............... 219/221, 219/227, 231, 235–238, 229; 228/51, 55
See application file for complete search history.

(56) References Cited

U.S. PATENT DOCUMENTS

| 1,686,328 | A | * | 10/1928 | Bertalan et. al. | ............ 219/238 |
| 1,820,799 | A | * | 8/1931 | Hazlett et. al. | ............ 219/240 |
| 2,544,326 | A | * | 3/1951 | Jones | ............ 219/507 |
| 2,680,796 | A | * | 6/1954 | Aversten | ............ 219/98 |
| 2,747,074 | A | * | 5/1956 | Finch | ............ 219/237 |
| 3,048,687 | A | * | 8/1962 | Knowles | ............ 219/530 |
| 3,105,135 | A | | 9/1963 | Finch et al | |
| 3,524,045 | A | * | 8/1970 | Siegel | ............ 219/229 |
| 3,699,306 | A | * | 10/1972 | Finch | ............ 219/241 |
| 4,014,343 | A | * | 3/1977 | Esty | ............ 606/45 |
| 4,734,559 | A | * | 3/1988 | Fortune et al. | ............ 219/241 |
| 4,839,501 | A | | 6/1989 | Cowell | |

(Continued)

FOREIGN PATENT DOCUMENTS

DE G 89 13 092.8 2/1990

(Continued)

OTHER PUBLICATIONS

European Search Report, Jun. 1, 2006, Taiyo Electric Ind. Co.

(Continued)

*Primary Examiner*—Stephen J Ralis
(74) *Attorney, Agent, or Firm*—Matthew B. Dernier, Esq.; Gibson & Dernier LLP

(57) ABSTRACT

A soldering iron including: a soldering tip that melts solder at a distal end; an iron body to which the soldering tip is fixed; at least one male connecting end provided at a base end of the soldering tip; at least one female connecting end built into the distal end of the iron body and into which the male connecting end is fittingly inserted; and a grip having heat insulating properties provided around the outer periphery of the soldering tip to cover the base end region of the soldering tip.

12 Claims, 8 Drawing Sheets

U.S. PATENT DOCUMENTS

| | | | | |
|---|---|---|---|---|
| 5,064,994 | A * | 11/1991 | Urban | 219/233 |
| 5,143,272 | A | 9/1992 | Carlomagno et al. | |
| 5,422,457 | A * | 6/1995 | Tang et al. | 219/238 |
| 6,513,697 | B1 | 2/2003 | Sines et al. | |
| 6,989,511 | B1 * | 1/2006 | Tsai | 219/229 |
| 2002/0158107 | A1 * | 10/2002 | Yokoo | 228/55 |
| 2004/0195228 | A1 * | 10/2004 | Konishi | 219/229 |
| 2005/0092729 | A1 * | 5/2005 | Konishi et al. | 219/229 |
| 2007/0272725 | A1 | 11/2007 | Zerweck et al. | |

FOREIGN PATENT DOCUMENTS

| | | |
|---|---|---|
| EP | 0386948 A1 | 3/1990 |
| JP | 3001893 | 6/1994 |
| WO | 2005118197 A1 | 12/2005 |

OTHER PUBLICATIONS

Office Action to corresponding Korean Patent Application No. 10-2006-0004422, dated Dec. 11, 2006, 3 pages.

Office Action to corresponding Indian Patent Application No. 3340/DEL/2005, filed Sep. 15, 2008.

* cited by examiner

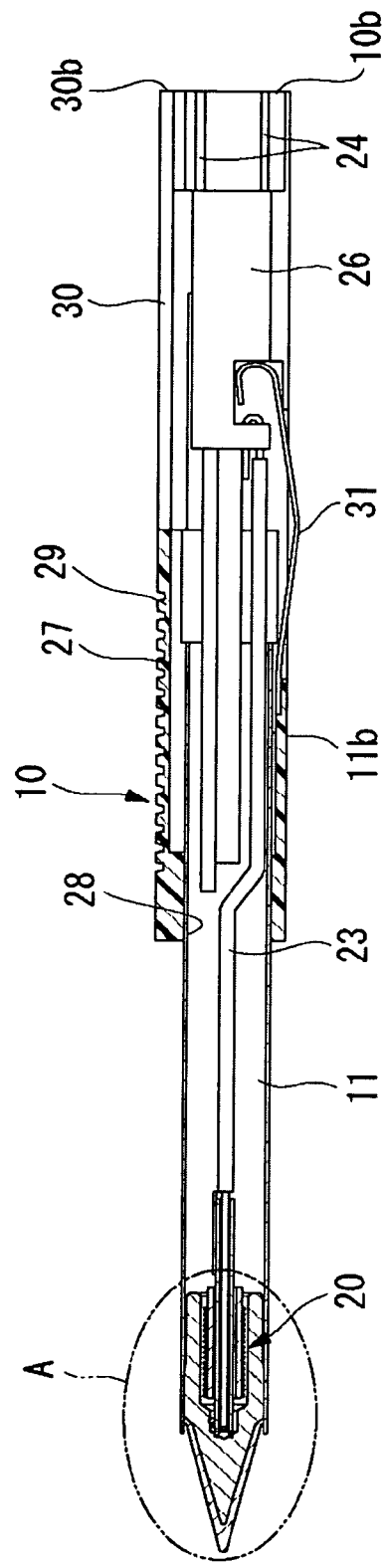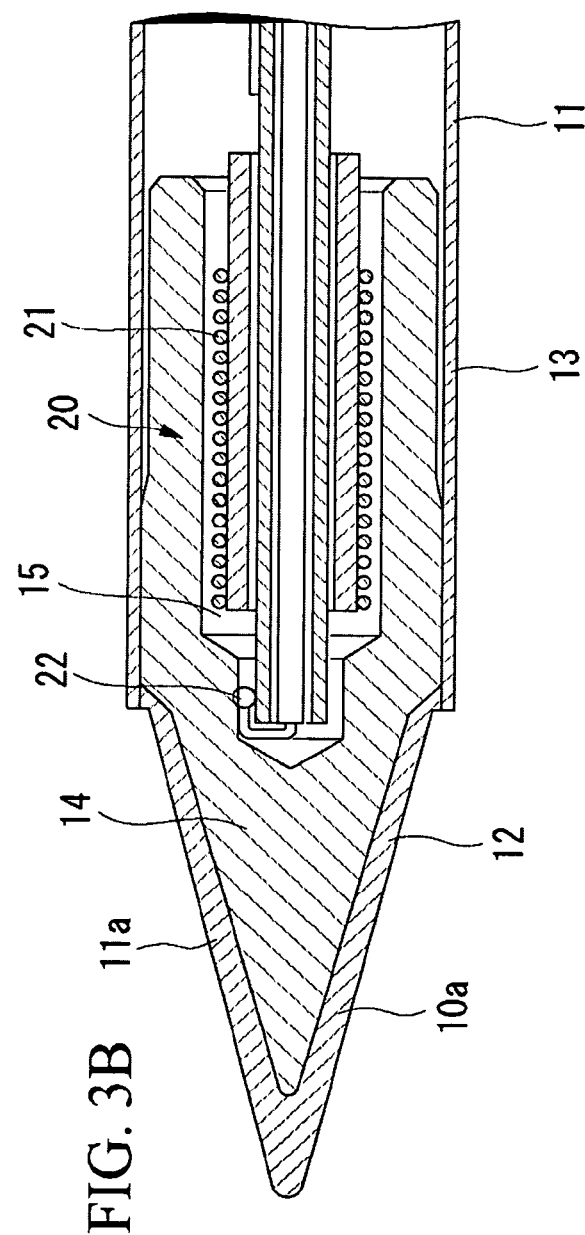
FIG. 3A
FIG. 3B

SOLDERING IRON HAVING A QUICKLY DETACHABLE TIP UTILIZING A RETRACTABLE INSULATED GRIPPING MECHANISM

BACKGROUND OF THE INVENTION

1. Field of the Invention

This invention relates to a soldering iron, and particularly to a soldering iron with a replaceable tip.

Priority is claimed on Japanese Patent Application No. 2005-010092, filed Jan. 18, 2005, the content of which is incorporated herein by reference.

2. Description of Related Art

Soldering tips of soldering irons are widely available having copper of excellent thermal conductivity provided around the heater and the outer surface of the copper being iron plated. The object of iron plating of the soldering tip is to prevent the copper from dissolving into the melted solder, so-called solder leach. The rate of solder leaching of iron plating is approximately one-tenth that of copper.

Nevertheless, iron plating in this type of soldering iron, while not to the extent of copper as mentioned above, still has a property of being leached by melted solder. Consequently, as soldering work is performed over time with this kind of soldering iron, the iron plating is slowly dissolved into the melted solder, eventually exposing the copper. Once the copper becomes thus exposed, it is quickly leached away, thereby rendering the soldering tip useless. That is, repeated soldering degrades the soldering tip, thereby causing the soldering iron as a whole to become unserviceable. To solve this problem, there have been proposed soldering irons having cartridge-type replaceable soldering tips (Japanese utility model (registered) Publication No. 3001893).

However, in a soldering iron constituted with the aforementioned replaceable soldering tip, when removing the soldering tip from the iron body, it is necessary to grasp the soldering tip by hand and pull on it. The soldering tip can be easily grasped by hand when the temperature of the soldering tip has cooled down to around room temperature. However, when the soldering tip is at a high temperature, the soldering tip cannot be removed by grasping by hand, and so replacement cannot be performed while waiting for the soldering tip to cool down.

SUMMARY OF THE INVENTION

The present invention was achieved in view of the above circumstances, and has as its object providing a soldering iron with a soldering tip that is easily replaceable without waiting for the soldering tip to cool down even when the soldering tip is at a high temperature during soldering work.

In order to solve the aforementioned problems, the present invention provides the following soldering iron.

The soldering iron of the present invention is a soldering iron including: a soldering tip that melts solder at a distal end thereof; an iron body to which the soldering tip is fixed; at least one male connecting end provided at a base end of the soldering tip; at least one female connecting end built into the distal end of the iron body and into which the male connecting end is fittingly inserted; and a grip having heat insulating properties provided around the outer periphery of the soldering tip to cover the base end region of the soldering tip.

According to this soldering iron, by pulling the grip or pushing by a certain member, the fitting between the male connecting end and the female connecting end fixing the soldering tip and the iron body may be released. Because of the heat insulating properties of the grip, which covers an area near the base end of the soldering tip, heat at the distal end of the soldering tip will not be transmitted to the grip even when the soldering tip is at a high temperature such as when using the soldering iron. Therefore, the user is able to hold the grip with his or her bare hands, and so even when using the soldering iron the user may remove the soldering tip from the iron body with his or her bare hands.

The soldering iron of the present invention is a soldering iron including: a soldering tip that melts solder at a distal end thereof; an iron body to which the soldering tip is fixed; at least one male connecting end provided at a base end of the soldering tip; at least one female connecting end built into the iron body and into which the male connecting end is fittingly inserted; a grip having heat insulating properties provided on the soldering tip to cover the base end region of the soldering tip; a base plate provided on the iron body and whose distal end abuts the base end of the grip; and a slide block integrated with the base plate that advances toward the distal end of the soldering tip or retreats toward the base end of the iron body, wherein advancing the slide block toward the distal end of the soldering tip causes the base end of the grip to be pushed by the distal end of the base plate, whereby the soldering tip is moved with respect to the iron body, and the fitting between the male connecting end and the female connecting end is released.

According to this soldering iron, when the slide block is advanced toward the distal end, the distal end of the base plate that is integrated with the slide block pushes the base end of the grip. By this, the grip moves so as to separate from the iron body. The soldering tip, which is integrated with the grip, thereby also moves so as to separate from the iron body. When the soldering tip is moved by separating from the iron body, the fitting between the male connecting end provided at the base end of the soldering tip and the female connecting end built in the iron body is released.

Accordingly, when the slide block is made to slide so as to advance toward the distal end, the fitting between the soldering tip and the iron body is released, and the soldering tip may be easily removed from the iron body. Since the fitting between the soldering tip and the iron body is released even if, for example, the soldering tip is at a high temperature, the soldering tip may be removed from the iron body.

In this soldering iron, it is preferable that a heat insulating layer is provided between the grip and near the base end region of the soldering tip.

In this soldering iron, even if the area near the base end of the soldering tip becomes hot during use of the soldering iron, it will be insulated by the heat insulating layer, thereby hindering the grip from becoming a high temperature. Accordingly, as mentioned above, in removing the soldering tip from the iron body, it is easy to hold the grip by hand. Therefore, a soldering iron is obtained in which the soldering tip may be easily removed from the iron body.

Moreover, the soldering iron may further include an outer case that houses the grip when the male connecting end is fittingly inserted in the female connecting end, and exposes the grip from the iron body when the soldering tip is detached from the iron body.

According to this soldering iron, the grip is stored by the outer case during use, offering a good external appearance, and when removing the soldering tip from the iron body, it is easy to hold the grip by hand. In addition, since the heat of the soldering tip is hindered from being transmitted to the grip, even if a soldering tip is at a high temperature, the grip may be touched with bare hands. Therefore, a soldering iron is obtained in which the soldering tip is easily removable from the iron body.

In this soldering iron, the soldering iron may further include a biasing means that biases the grip towards the inner circumference of the outer case which is provided inside of the outer case.

According to this soldering iron, since the outer periphery of the grip is pressed by the inner circumference of the outer case, the frictional force between the grip and the outer case is increased, which serves to more securely fix the soldering tip and the iron body so that it may be preferably used during soldering work.

According to the soldering iron of the present invention, when replacing the soldering tip of the soldering iron, even when the soldering tip is at a high temperature during soldering work, the soldering tip may be easily replaced without waiting for the soldering tip to cool down.

BRIEF DESCRIPTION OF THE DRAWINGS

FIG. 3A is a sectional side view of the soldering tip, and FIG. 3B is an enlarged sectional view of the distal end of the soldering tip.

DETAILED DESCRIPTION OF THE INVENTION

Figure 1:
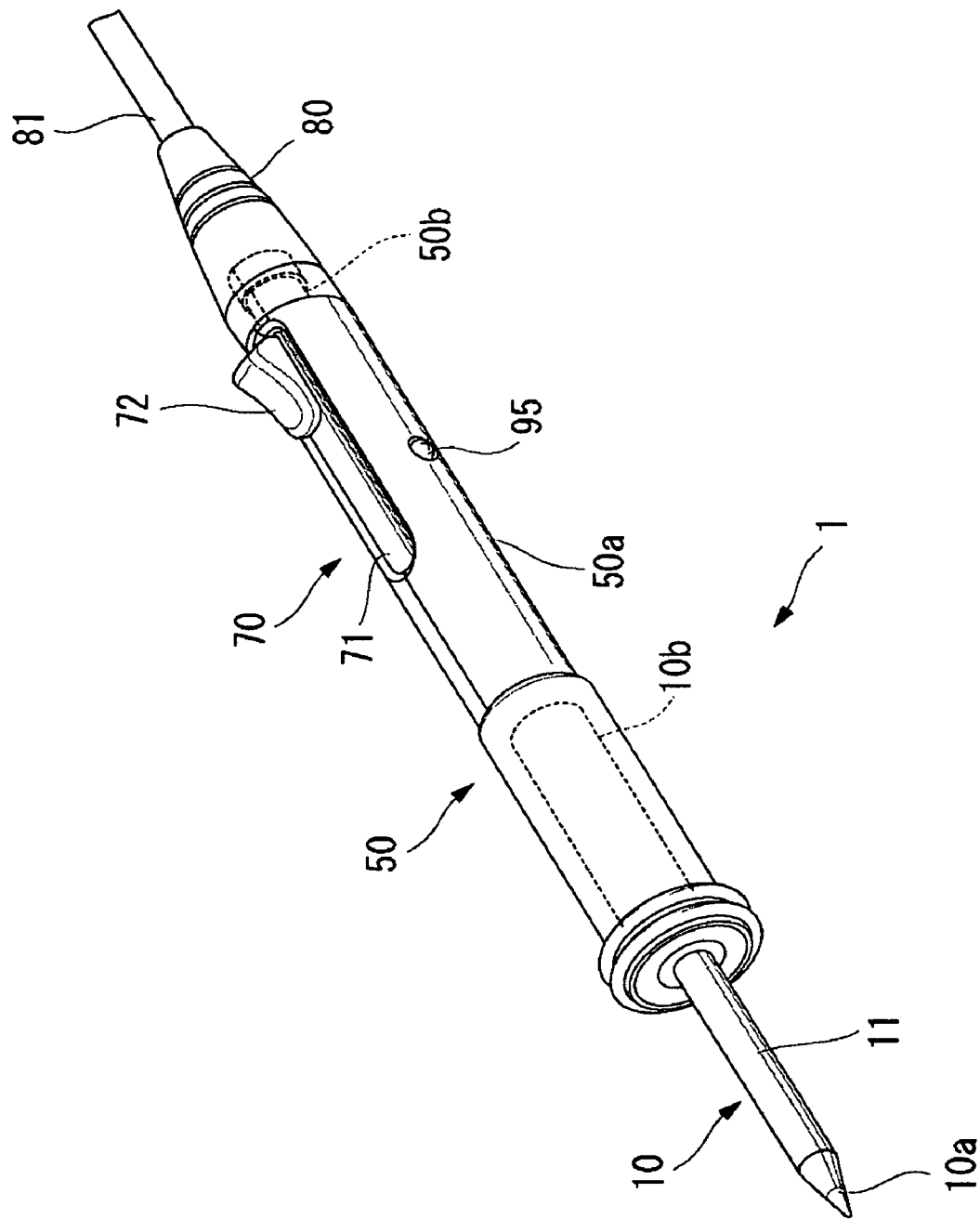
FIG. 1 is a perspective view of the soldering iron according to the present invention.
Figure 2:
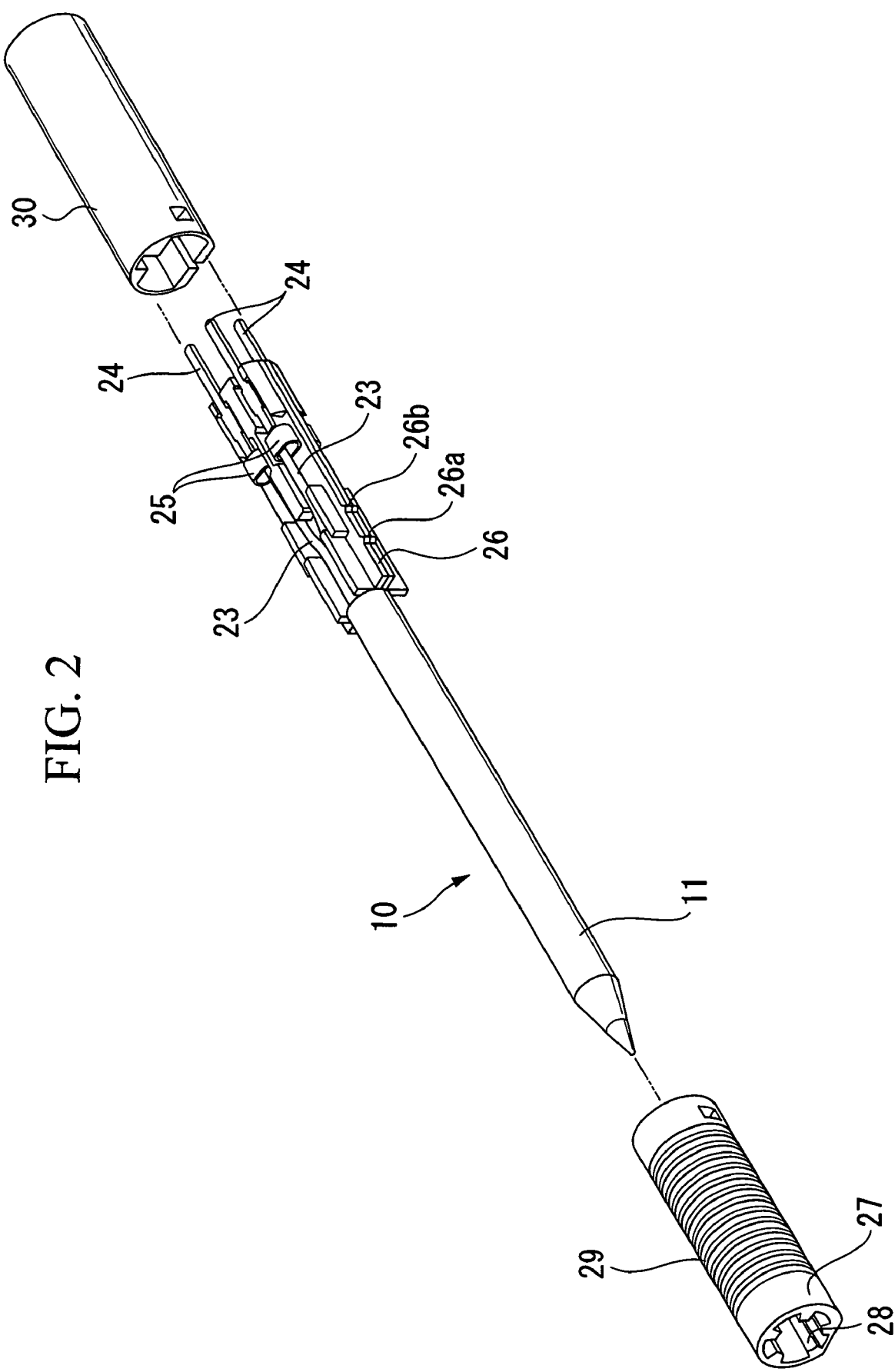
FIG. 2 is an exploded perspective view of the soldering tip.
Figure 4A:
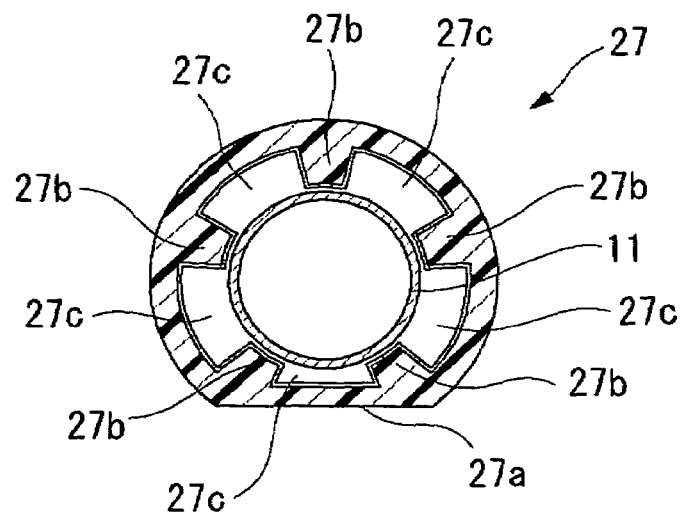
FIG. 4A is a sectional view of the transverse direction of the grip portion.
Figure 4B:
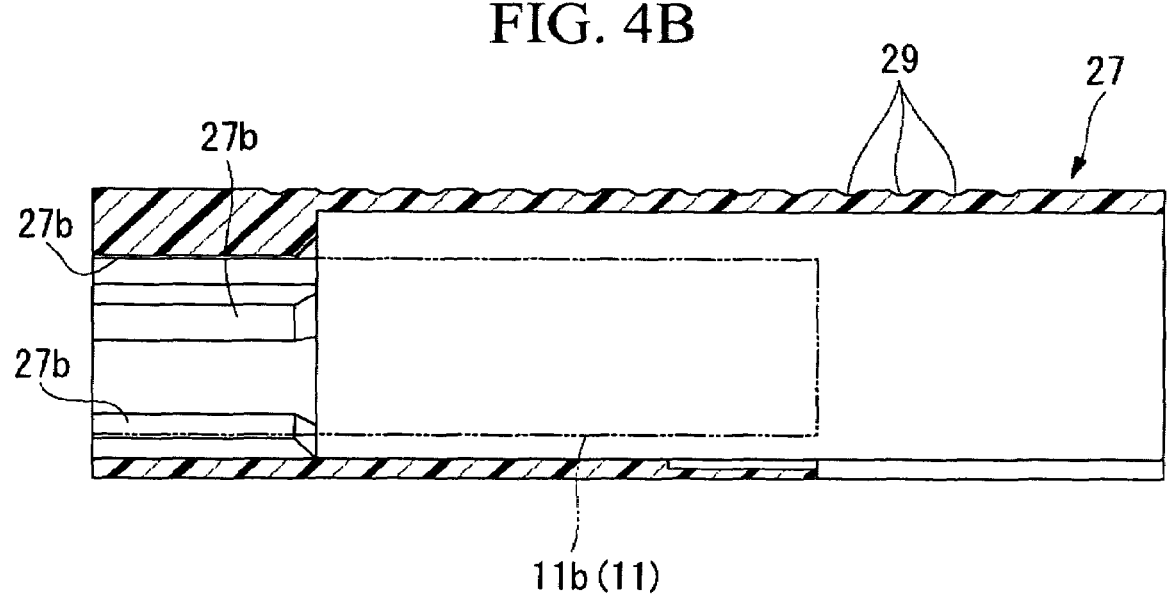
FIG. 4B is a sectional view of the longitudinal direction of the grip portion.
Figure 5:
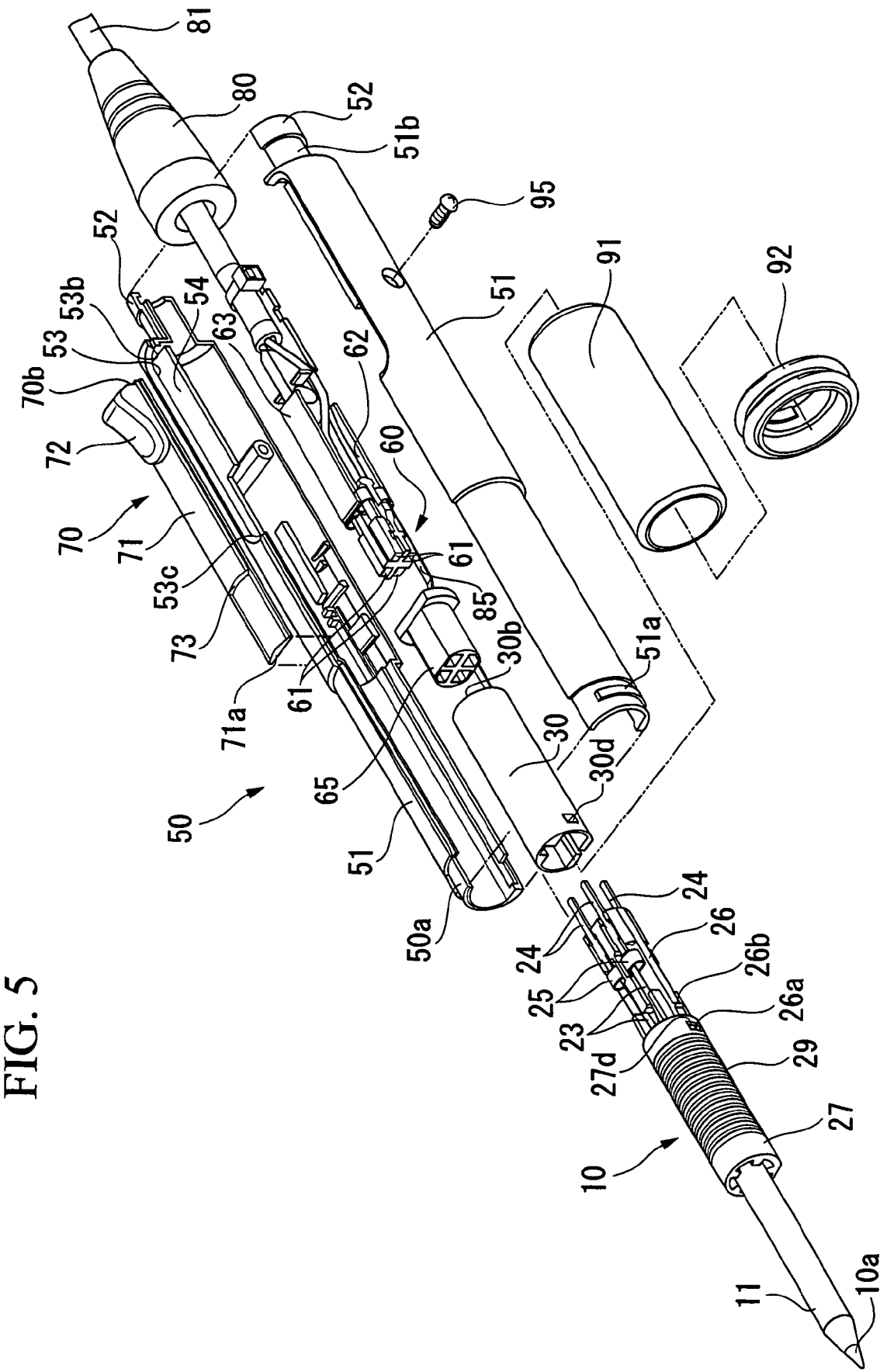
FIG. 5 is an exploded perspective view of the soldering iron of FIG. 1.
Figure 6:
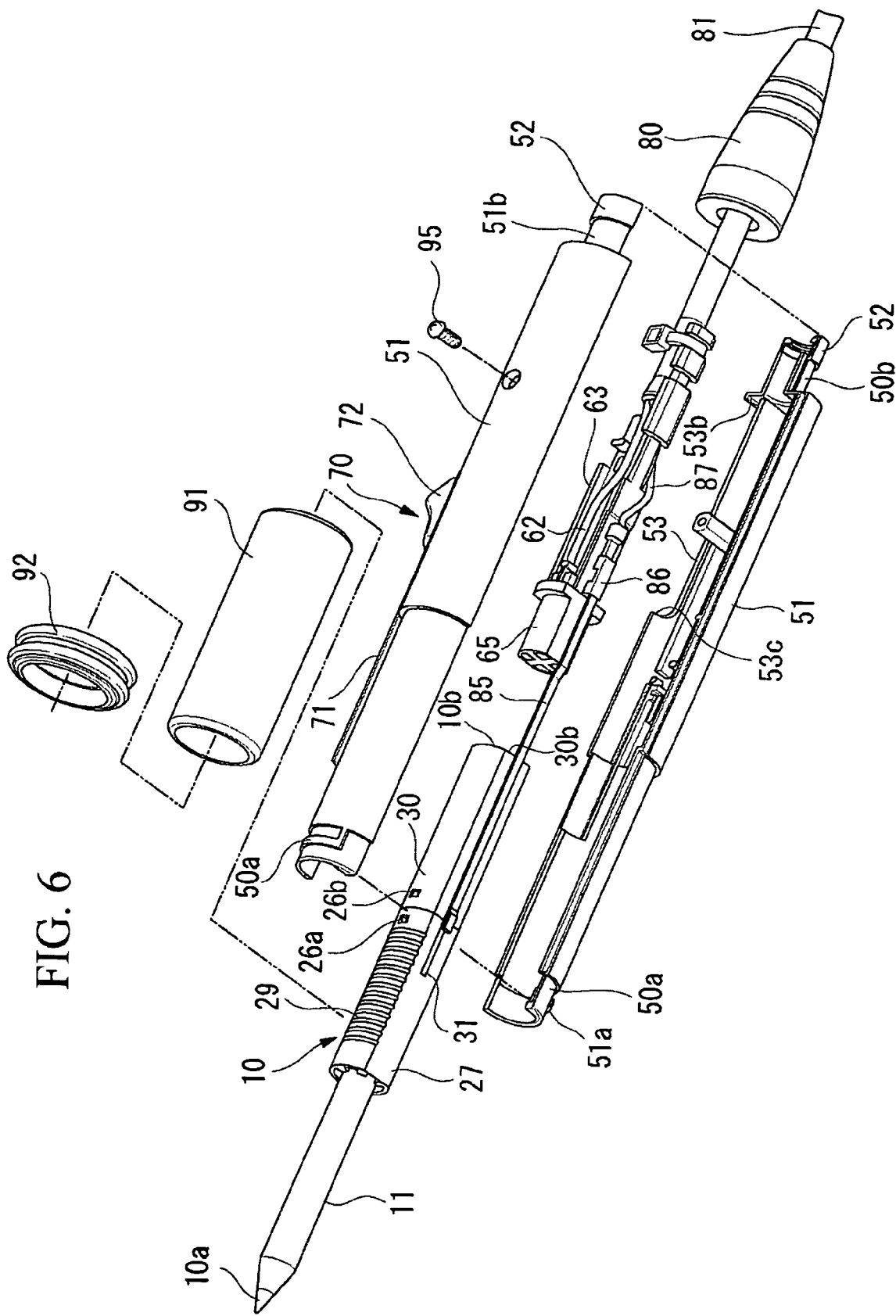
FIG. 6 is an exploded perspective view of the soldering iron of FIG. 1.
Figure 7A:
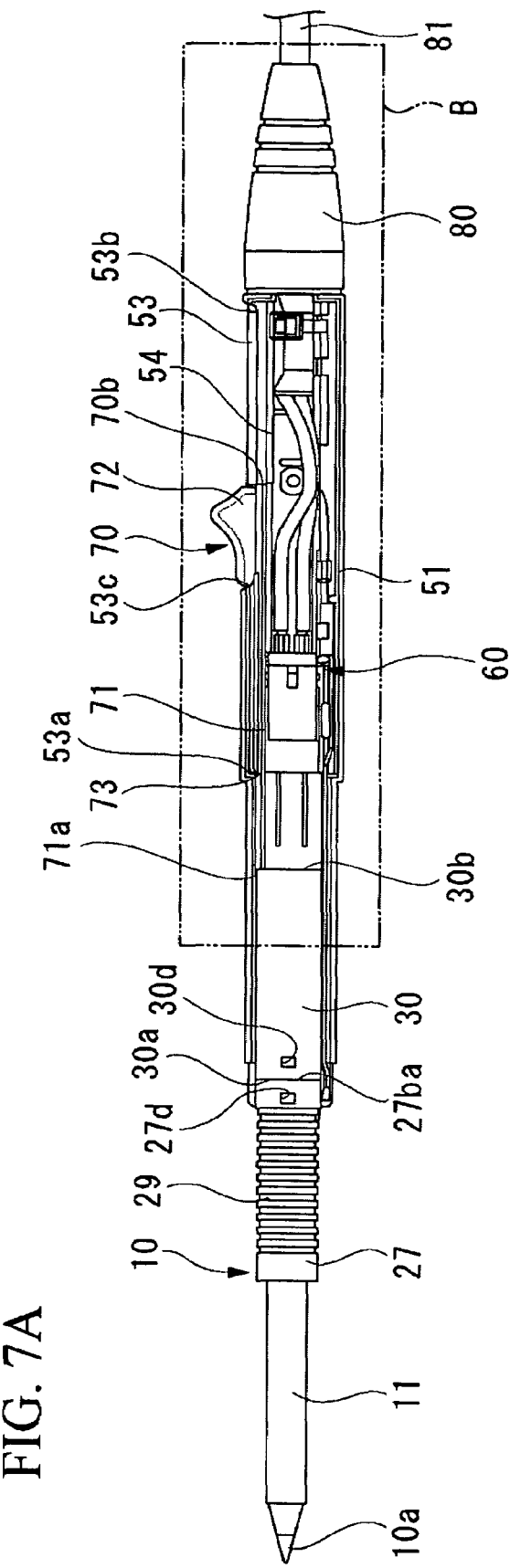
FIG. 7A is a side view of the state of half of the outer case removed from the soldering iron of FIG. 1.
Figure 7B:
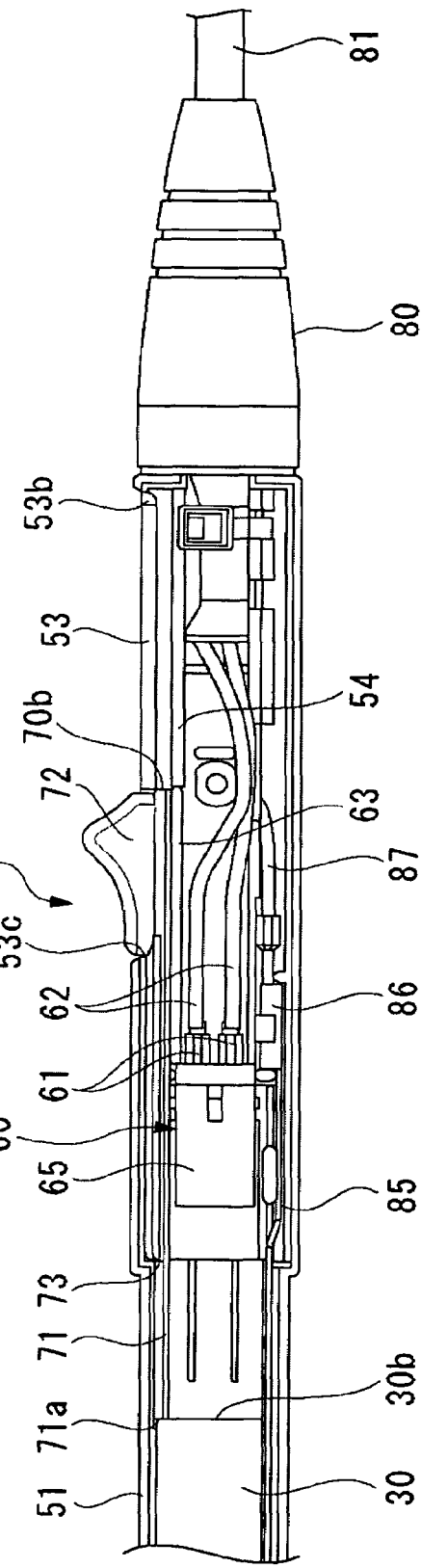
FIG. 7B is an enlarged view of area B shown in FIG. 7A.

Below, the preferred embodiment of the soldering iron of the present invention is explained. FIG. 1 is a perspective view of the soldering iron according to the present invention, FIG. 2 is an exploded perspective view of the soldering tip, FIG. 3A is a sectional side elevation of the distal end of the soldering tip, FIG. 3B is an enlarged sectional view of the distal end of the soldering tip, FIG. 4A is a sectional view of the transverse direction of the grip portion, FIG. 4B is a sectional view of the longitudinal direction of the grip portion, FIG. 5 is an exploded perspective view of the soldering iron of FIG. 1, FIG. 6 is an exploded perspective view of the soldering iron of FIG. 1, FIG. 7A is a side view of the state of half of outer case 51 removed from the soldering iron of FIG. 1, and FIG. 7B is an enlarged view of area B shown in FIG. 7A.

In FIG. 1, reference symbol 1 is the soldering iron of the working example of this embodiment.

The soldering iron 1 is used for the object of melting solder at a distal end 10a thereof and attaching the melted solder to a desired place, or removing attached solder. The soldering iron 1 on the whole has a soldering tip 10 that melts solder at the distal end 10a, and an iron body 50 to which a base end 10b side of the soldering tip 10 is fixed. A cord armor 80 formed with rubber is attached to the base end 50b of the iron body 50. A cord 81 connectable with a power supply is provided at the cord armor 80. Below, references simply to the "distal end" mean the end portion of a member in the direction of the soldering tip distal end 10a, and references simply to the "base end" mean the end portion of a member in the direction of the iron body base end 50b.

The soldering tip 10 will now be explained.

The soldering tip 10, as shown in FIG. 2, is generally constituted by a soldering tip body 11, a heating device 20 built into the soldering tip body 11 (see FIG. 3B), and a grip portion 27 that covers the base end 11b region of the soldering tip body 11.

As shown in FIG. 3A and FIG. 3B that is an enlargement of area A in FIG. 3A, the soldering tip body 11 is constituted as a unit from a distal end portion 12 formed into a conical shape having a hollow interior, and a cylindrical portion 13 provided connected to the base end side open end of the distal end portion 12. The distal end portion 12 is the distal end 10a of the soldering tip 10. The soldering tip body 11 is formed with iron, and the interior of the distal end 11a is filled with a conduction portion 14 made of copper providing excellent thermal conductivity. A cylindrical hollow portion 15 is formed inside the conduction portion 14. A heater 21 formed into a coil shape and a temperature sensor 22 are built into the hollow portion 15, being filled with electrically insulating ceramics (not shown) so as to plug any gaps therein. The heater 21 and the temperature sensor 22 constitute the heating device 20.

The heater 21 is provided for the object of heating the distal end 10a of the soldering tip 10. The temperature sensor 22 is provided for the object of measuring the temperature of the distal end 10a of the soldering tip 10.

Connection lead wires 23 are connected to the heater 21 and the temperature sensor 22, respectively. Two connection lead wires 23 each are arranged for the object of supplying electric power to the heater 21 and transmitting a measurement signal from the temperature sensor 22, with a total of four wires being connected. A spring member 31 that contacts the soldering tip body 11 is formed on the soldering tip 10. The spring member 31 is a lamellar member made of a conductive metal bent into a substantially L shape that contacts a metal band 85 provided on an iron body 50 explained hereinbelow, with one end connected to the soldering tip body 11, and the other end connected with the metal band 85. When the soldering tip 10 is attached to an outer case 51, the spring member 31 is compressed by being pressed by the metal band 85 within the outer case 51, thereby causing the bend portion to deform. Since the compressed spring member 31, attempting to extend from the elastic force, presses the inner surface of the outer case 51, a grip portion 27 and a terminal cover 30 are biased toward the inner circumference side of the outer case 51 (iron body 50). In addition, an electrical charge that accumulates on the soldering tip body 11 is discharged (dissipated) through the spring member 31, the metal band 85, and a ground lead 87.

Male connecting ends (hereinafter, referred to as "male terminals") 24, which are long and slender lamellar contact terminals made of metal, are provided at the end portion of the connection lead wires 23. Compression bonding portions 25 are formed that stack the end portions of the connection lead wires 23, whose coatings are stripped to expose their conductor wires, with one end of the male terminals 24 to integrally join them, thereby connecting the ends of the connection lead wires 23 and the male terminals. The male terminals 24 extend in parallel with the axial direction of the soldering tip 10. Thus providing the male terminals 24 enables suitable fitting with female connecting ends (hereinafter, referred to as "female terminals") 61 explained hereinbelow, and the male terminals 24 may be inserted in the female terminals 61. Reference symbol 26 is a first interposition member that aligns and supports the male terminals 24 so that they may project in the axial direction of the soldering tip 10 while mutually insulating the connection lead wires 23 and the male terminals 24.

A grip portion 27 is formed on the soldering tip body 11 in which the heating device 20 is built in. The grip portion 27 is made of resin providing excellent electrical insulation and heat resistance, and is formed substantially cylindrical. As shown in FIG. 4A, the grip portion 27 has a sectional profile in which a part of the cylindrical external wall surface is cut away, forming a flat surface portion 27a. By forming the flat surface portion 27a, the grip portion 27 is favorably positioned and held when being housed in the outer case 51 explained hereinbelow. As shown in FIGS. 3A and 4B, in order to prevent slipping when grasping by hand, a plurality of grooves 29 which extend in a circumferential direction are formed on the peripheral surface of the grip portion 27.

Inside the grip portion 27 are formed five projections 27b that project inward and support the soldering tip body 11. An inner circumference side 28 of the projections 27b makes close contact with the peripheral surface of the soldering tip body 11 in the base end 11b region. Thus, the soldering tip body 11 is held in the grip portion 27. Air spaces 27c are formed between each projection 27b as a result of projections 27b holding the soldering tip body 11 in the base end 11b region. Because of the high heat insulating properties of air in the air spaces 27c, heat is hindered from being conducted from the soldering tip body 11 at the grip portion 27. The air spaces 27c are equivalent to a heat insulating layer in this invention. By substituting a suitable heat insulating material for the air spaces 27c, or the projections 27b and air spaces 27c, a heat insulating layer may be used in this invention.

The terminal cover 30 is provided adjacent to the grip portion 27 on the soldering tip 10. The terminal cover 30 is provided for the object of fitting into a cover 65 of the female terminals 61 provided on the iron body 50 side while protecting the male terminals 24 and electrically insulating them from the outside. Similarly to the grip portion 27 mentioned above, the terminal cover 30 is made of resin providing excellent electrical insulation and heat resistance and is formed substantially cylindrical. Protruding portions 26a and 26b provided on the first interposition member 26, which is fixed to the soldering tip body 11, are inserted into fitting holes 27d and 30d provided in the grip portion 27 and the terminal cover 30, respectively, thereby connecting the grip portion 27 and the terminal cover 30 to the soldering tip body 11. The grip in this invention is constituted by the grip portion 27 and the terminal cover 30. Therefore, the base end of the grip in this invention is the base end 30b of the terminal cover 30. The base end 30b of the terminal cover 30 abuts a distal end 71a of a base plate 71 of a slide block 70 explained hereinbelow when the soldering tip 10 is attached to the iron body 50. The base end 30b of the terminal cover 30 is abutted by the base end 27ba of the grip portion 27.

Next, the iron body 50 to which the soldering tip 10 is attached will be explained.

As shown in FIGS. 5, 6, 7A, and 7B, which is an enlarged view of area B shown in FIG. 7A, the iron body 50 is generally constituted by the outer case 51 formed approximately cylindrical, a connection device 60 built in the outer case 51, and the slide block 70 provided on the periphery of the outer case 51.

The outer case 51 is made of resin providing excellent electrical insulation and heat resistance, and is formed substantially cylindrical by combining two substantially semi-cylindrical members. A distal end 51a of the outer cast 51 is open and allows insertion and removal of the soldering tip 10, with the connection device 60 being provided in the internal hollow. A retaining portion 52 for retaining the cord armor 80 is formed at a base end 51b of the outer case 51.

As shown in FIG. 7B, the connection device 60 is constituted by a plurality of female terminals 61 and lead wires 62 connected to each of the female terminals 61. The female terminals 61 are terminal connected to the male terminals 24, with four being provided to correspond to the four male terminals 24. The cord 81 is connected to the lead wires 62. The cover 65 is provided for enclosing the female terminals 61 and protecting the female terminals 61.

In the connection device 60 is provided a second interposition member 63 that mutually insulates the female terminals 61 and the lead wires 62, and aligns and supports the female terminals 61 along the axial direction of the soldering tip 10. The top surface of the second interposition member 63 is formed flat in order to suitably guide the slide block 70 explained hereinbelow. The metal band 85 which contacts the spring member 31, and the ground lead 87 connected to the metal band 85 are disposed at the lower part of the second interposition member 63. The metal band 85 is fixed by the second interposition member 63 and the outer case 51.

A notch section 53, in which the slide block 70 explained hereinbelow is disposed, is provided on the outer case 51 from the base end region to substantially the center, so as to allow forward and backward movement of the slide block 70. The notch section 53 extends in the axial direction of the outer case 51, and is formed to a size fitting the width and length of the slide block 70 explained hereinbelow. A guide plate 54 that guides the sliding of the slide block 70 is provided in the interior of the outer case 51 along the notch section 53.

The slide block 70 is constituted from the base plate 71 that is disposed in the outer case 51 and slides in contact with the top surfaces of the guide plate 54 and the second interposition member 63, and a pushing projection 72 formed to protrude from the base end side of the base plate 71 outward of the outer case 51 through the notch section 53. A step 73 that drops toward the distal end is formed in the middle portion of the top face of the base plate 71. When the distal end of the pushing projection 72 runs against a distal end edge 53c of the notch section 53, advancing of the slide block 70 is restricted so as to stop. When the soldering tip 10 is attached to the iron body 50, the distal end 71a of the base plate 71 is abutted by the base end 30b of the terminal cover 30. Since the bottom surface of the base plate 71 is flat, the slide block 70 is suitably guided by the top surfaces of the guide plate 54 and the second interposition member 63. When the slide block 70 is moved forward toward the iron body distal end 51a, it stably slides until the position where the distal end of the pushing projection 72 runs against the distal end edge 53c of the notch section 53 (distal end position). In the case of the soldering tip 10 being attached to the iron body 50, the terminal cover 30, i.e., the soldering tip 10, pushed by the slider 70 then moves in the direction to be ejected from the outer case 51. When the slide block 70 moves back toward the iron body base end 50b, a back end portion 70b of the slide block 70 stably slides until the position where it runs against a back end edge 53b of the notch section 53 (base end position).

In the soldering iron 1 constituted as described above, a cylinder 91 is provided covering the periphery of the iron body 50 in order to ensure secure assembly and enhance the grip of the soldering iron. The cylinder 91 is made of a rubber material. A fastener 92 that prevents the cylinder 91 from slipping off the iron body 50 is attached to the distal end portion of the iron body 50. The soldering iron 1 is securely integrated by providing the cylinder 91 and the fastener 92, fixing the divided outer case 51 with a screw 95, and fitting the cord armor 80 into the retaining portion 52 of the outer case 51.

Figure 8A:
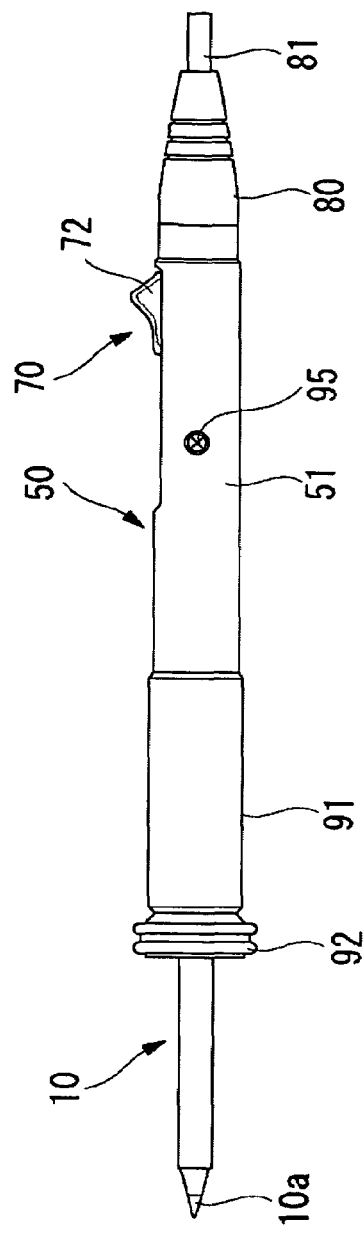
FIGS. 8A to 8C are views showing the stepwise removal of the soldering tip from the iron body.
Figure 8B:
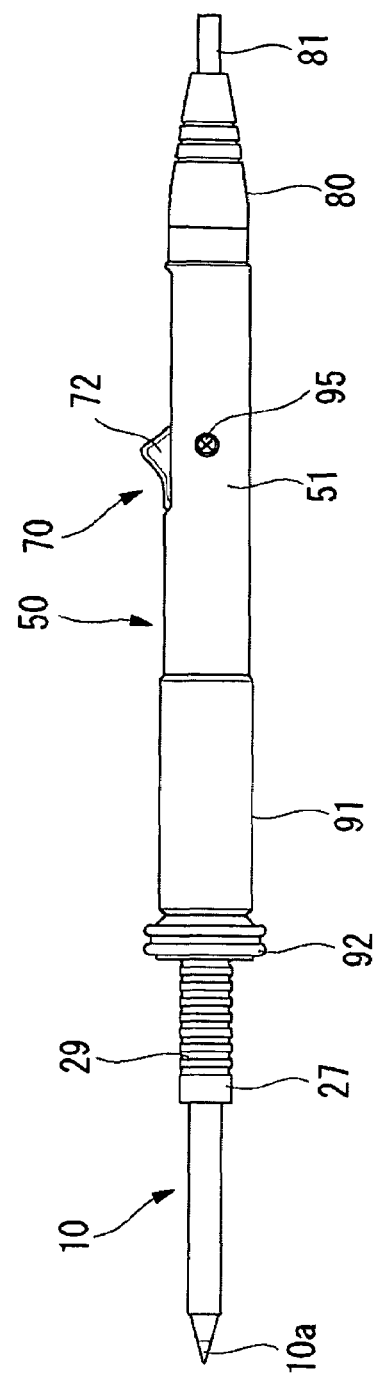
Figure 8C:
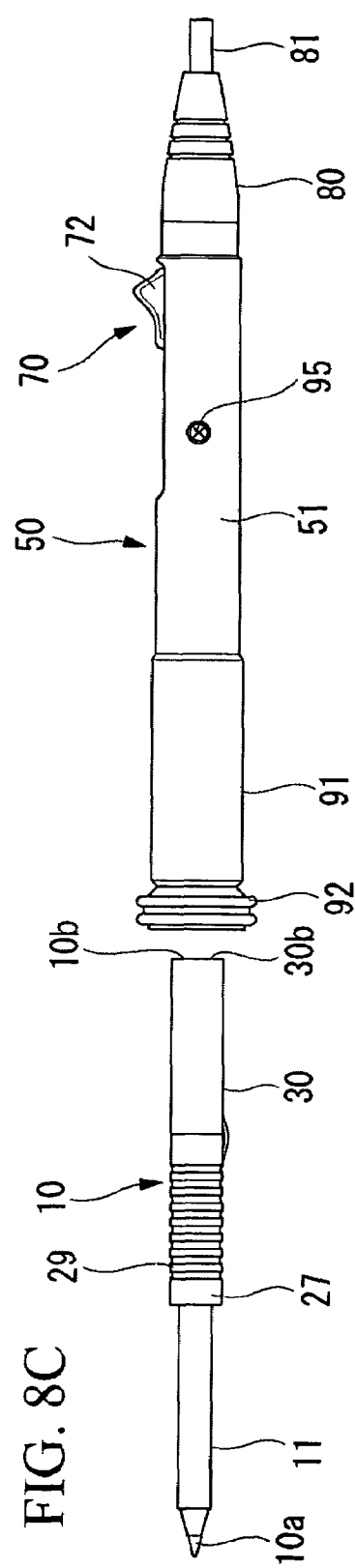

Next, the operations and advantages exhibited by the above-described soldering iron 1 will be explained referring to FIGS. 8A to 8C. FIGS. 8A to 8C are stepwise views of the soldering iron 1 when the soldering tip 10 is removed from the iron body 50. FIG. 8A shows the state of the soldering tip 10 attached to the iron body 50, FIG. 8B shows the state of the slide block 70 slid toward the soldering tip 10, and FIG. 8C shows the state of the soldering tip 10 removed from the iron body 50.

As shown in FIG. 8A, the soldering iron 1 has a cartridge-type replaceable soldering tip 10 that is attached to the iron body 50 having an opening at the distal end thereof. The male terminals 24 provided at the base end side of the soldering tip 10 are fit into the female terminals 61 provided inside the iron body 50. Moreover, the terminal cover 30 on the soldering tip 10 side and the cover 65 on the iron body 50 side are fit together. The male terminals 24 are suitably inserted in the female terminals 61, with the soldering tip 10 being fixed by this insertion so that it may not escape from the iron body 50. In addition, the periphery of the grip portion 27 is pressed against the inner circumference of the iron body 50 by the biasing of the spring member 31 compressed by the metal band 85, which is provided inside of the iron body 50. The frictional force between the periphery of the grip portion 27 and the inner circumference of the iron body 50 is heightened by such a constitution, thereby securely fixing the soldering tip 10 and the iron body 50. The iron body 50 may be simply yet stably assembled by providing the cylinder 91 and the fastener 92, integrally fixing the outer case 51 with the screw 95 and fitting the cord armor 80.

When the pushing projection 72 of the slide block 70 is pushed with a finger toward the soldering tip distal end 10a, the slide block 70 slides while being guided by the top surface of the guide plate 54 and the second interposition member 63. In the case in which the soldering tip 10 is attached, the distal end 71a of the base plate 71, which constitutes the slide block 70, presses the base end 30b of the terminal cover 30 serving as the grip base end in this invention, thereby moving the terminal cover 30 forward toward the distal end 10a of the soldering tip 10. By this, the soldering tip 10 moves so as to be separated from the iron body 50. To wit, the soldering tip 10 is pushed out of (ejected) from the outer case 51 of the iron body 50. In addition, the grip portion 27, which was until then stored in the outer case 51, also moves together with the soldering tip 10 and is exposed from the outer case 51.

When the soldering tip 10 thus moves to be separated (ejected) from the iron body 50, the fitting between the male terminals 24 provided in the soldering tip 10 and the female terminals 61 provided in the iron body 50 and the fitting between the terminal cover 30 and the cover 65 are released. Furthermore, since the grip portion 27 housed in the cylinder 91 appears outside the iron body 50, a user may now grasp the grip portion 27 by hand and pull the soldering tip 10 out from the iron body 50. The grip portion 27 is made of resin providing excellent electrical insulation and heat resistance as described above. Therefore, because the grip portion 27 does not reach a high temperature even when the distal end 10a of the soldering tip 10 is at a high temperature, the user may grasp the grip portion 27 with no difficulty. Accordingly, the soldering tip 10 may be pulled out easily as shown in FIG. 8C even while performing soldering work.

When a new soldering tip 10 is inserted in the iron body 50 to replace the extracted soldering tip 10, the soldering iron may be used again as if it were new. When inserting the new soldering tip 10 into the soldering body 50, it is necessary to push it until the male terminals 24 are inserted in the female terminals 61. During this operation, the base end 30b of the terminal cover serving as the grip base end in this invention presses the distal end 71a of the base plate 71 which constitutes the slide block 70, causing it to move back toward the base end 50b of the iron body 50.

While preferred embodiments of the invention have been described and illustrated above, it should be understood that these are exemplary of the invention and are not to be considered as limiting. Additions, omissions, substitutions, and other modifications may be made without departing from the spirit or scope of the present invention. Accordingly, the invention is not to be considered as being limited by the foregoing description, and is only limited by the scope of the appended claims. For example, in the soldering iron of the aforementioned preferred embodiment, the distal end 10a of the soldering tip 10 was made conical, but any suitable shape may be chosen without being limited to this example. Also, replacement of the soldering tip 10 may be suitably performed depending on the various uses, and not just when solder leaching has advanced.

In addition, suitable shapes may be chosen for the shape of the iron body 50 and the shape of a slide block 70 described above.

Furthermore, for the soldering iron 1, a stopper that hinders separation of the grip portion 27 from the outer case 51 may be provided at the distal end 50a of the iron body 50. Providing such a stopper may hinder separation of the soldering tip 10 from the iron body 50 during soldering work.

What is claimed is:
1. A soldering iron, comprising:
a heated soldering tip that melts solder at a distal end;
a body of the iron to which said soldering tip is fixed, said body including an outer case having an inner surface;
at least one first connecting end provided at a base end of said soldering tip;
at least one second connecting end near a distal end of said body engaging with said first connecting end to detachably fix the soldering tip to the body;
a grip having heat insulating properties provided around an outer periphery of said soldering tip to cover a base end region of said soldering tip;
a storage portion near the distal end of said body constructed to store substantially the entire grip when the first and second connecting ends engage;
a slide block assembly mounted on said body for movement in a longitudinal direction therealong between a distal position and a near position, such that in said distal position a distal portion of said slide block assembly presses a portion of said grip so as to release engagement between said first and second connecting ends, and wherein in said near position the distal portion does not press said grip;
a metal band electrically coupled to a ground lead and extending in the longitudinal direction between the inner surface of the outer case and the grip; and
biasing means provided separately from the first and second connecting ends, that biases said grip towards said inner surface of said outer case, so as to inhibit relative motion between said grip and said outer case, where the biasing means operates to slide along, and remain in electrical contact with, the metal band as the grip slides in response to the slide block assembly.

2. The soldering iron according to claim 1, further comprising a heat insulating layer between said grip and the base end region of said soldering tip.

3. The soldering iron according to claim 1, wherein the storage portion is formed to be cylindrical by combining two substantially semi-cylindrical members.

4. The soldering iron according to claim 1, wherein a portion of the grip is exposed from the storage portion when the slide block is at the distal end position.

5. The soldering iron according to claim 1, further comprising a cylinder which covers a periphery of a distal end of the storage portion, wherein the cylinder is more distal than the slide block, and the cylinder and the slide block are longitudinally aligned along the storage portion.

6. The soldering iron according to claim 1 wherein said grip is so disposed on the soldering tip so that at least a portion thereof protrudes from said storage portion when said slide block is in its distal position, so that said grip may be grasped to remove the tip from the storage portion.

7. The soldering iron according to claim 1, further comprising means, in addition to said first and second connecting ends, inhibiting separation of said soldering tip from said body, whereby said soldering tip will not fall away from said body when said slide block is brought to its distal position to release engagement between said first and second connecting ends.

8. The soldering iron according to claim 1, wherein the soldering tip is heated by means of a heater provided inside said tip and further comprising a temperature sensor inside said tip.

9. The soldering iron according to claim 1, wherein said first and second connecting ends also comprise an electrical connection, the electrical connection being opened upon disengagement of said connecting ends through the operation of the slide block assembly.

10. The soldering iron according to claim 1, further comprising a storage portion near the distal end of said body constructed to store substantially the entire grip when the first and second connecting ends engage.

11. The soldering iron according to claim 1, further comprising a terminal cover which entirely covers said first connecting end.

12. The soldering iron according to claim 11, wherein said terminal cover prevents said first connecting end from being touched when said soldering tip is pulled out from said body.

* * * * *